(12) United States Patent
Curtiss, III

(10) Patent No.: US 9,260,931 B2
(45) Date of Patent: Feb. 16, 2016

(54) RISER BREAKAWAY CONNECTION AND INTERVENTION COUPLING DEVICE

(71) Applicant: Jason P. Curtiss, III, Houston, TX (US)

(72) Inventor: Jason P. Curtiss, III, Houston, TX (US)

(73) Assignee: BP Corporation North America Inc., Houston, TX (US)

(*) Notice: Subject to any disclaimer, the term of this patent is extended or adjusted under 35 U.S.C. 154(b) by 9 days.

(21) Appl. No.: 14/199,091

(22) Filed: Mar. 6, 2014

(65) Prior Publication Data

US 2014/0251631 A1 Sep. 11, 2014

Related U.S. Application Data

(60) Provisional application No. 61/776,051, filed on Mar. 11, 2013.

(51) Int. Cl.
| | |
|---|---|
| *F16L 55/00* | (2006.01) |
| *F16L 15/00* | (2006.01) |
| *E21B 33/038* | (2006.01) |
| *E21B 17/06* | (2006.01) |
| *E21B 17/08* | (2006.01) |
| *F16L 55/10* | (2006.01) |
| *E21B 43/01* | (2006.01) |

(52) U.S. Cl.
CPC .............. *E21B 33/038* (2013.01); *E21B 17/06* (2013.01); *E21B 17/085* (2013.01); *F16L 55/1007* (2013.01); *E21B 43/0122* (2013.01)

(58) Field of Classification Search
None
See application file for complete search history.

(56) References Cited

U.S. PATENT DOCUMENTS

| | | | |
|---|---|---|---|
| 1,199,029 A | | 9/1916 | Hovis |
| 3,266,825 A | * | 8/1966 | Magorien ........... F16L 27/0832 285/277 |
| 3,345,087 A | | 10/1967 | Hanes et al. |
| 4,364,587 A | | 12/1982 | Samford ........................ 285/3 |

(Continued)

FOREIGN PATENT DOCUMENTS

| | | |
|---|---|---|
| EP | 0 709 545 B1 | 10/1995 |
| GB | 2199103 | 6/1988 |

(Continued)

OTHER PUBLICATIONS

Sangesland et al., "Riserless Casing While Drilling Using a Dual Gradient Mud System," Proceedings of the Eleventh (2001) International Offshore and Polar Engineering Conference, Stavanger, Norway, Jun. 17-22, 2001.

*Primary Examiner* — Matthew Buck
*Assistant Examiner* — Douglas S Wood
(74) *Attorney, Agent, or Firm* — Jayne C. Piana

(57) ABSTRACT

A breakaway connection for a subsea riser, the connection including a tubular stabbing member having a central axis, an upper end, a radially outer cylindrical surface, a radially inner surface, and an annular recess in the outer cylindrical surface. The breakaway connection also includes a tubular female member having a central axis, a lower end, a radially outer surface, a radially inner surface defining a receptacle extending axially from the lower end, and a plurality of circumferentially-spaced threaded holes extending radially from the radially outer surface to the receptacle, wherein the stabbing member is disposed in the receptacle and coaxially aligned with the female member. The breakaway connection further includes a plurality of shear pins, wherein each shear pin is threadably disposed in one threaded hole, and wherein each shear pin has a radially inner end seated in the annular recess.

8 Claims, 15 Drawing Sheets

(56) References Cited

U.S. PATENT DOCUMENTS

| | | | |
|---|---|---|---|
| 4,452,472 A | 6/1984 | Crase | 285/3 |
| 4,479,669 A | 10/1984 | Hynes | |
| 5,086,843 A | 2/1992 | Mims et al. | |
| 5,230,538 A | 7/1993 | Kobayashi | 285/316 |
| 5,255,714 A | 10/1993 | Mullins | 137/614.04 |
| 5,382,056 A | 1/1995 | Milberger | 285/1 |
| 5,727,640 A | 3/1998 | Gleditsch | 175/7 |
| 5,826,610 A * | 10/1998 | Bodhaine | F16L 29/00 |
| | | | 137/614.04 |
| 5,851,093 A | 12/1998 | Erickson | 409/234 |
| 6,557,637 B1 | 5/2003 | Dore et al. | 166/338 |
| 6,561,714 B1 | 5/2003 | Williams et al. | 403/2 |
| 8,181,704 B2 * | 5/2012 | Fenton | 166/338 |
| 8,256,538 B1 * | 9/2012 | Deslierres | E21B 17/01 |
| | | | 166/332.1 |
| 2010/0164223 A1 * | 7/2010 | Curtiss, III | F16L 25/065 |
| | | | 285/24 |
| 2014/0144646 A1 * | 5/2014 | Humphreys | 166/340 |

FOREIGN PATENT DOCUMENTS

| | | |
|---|---|---|
| WO | 9904131 | 1/1999 |
| WO | 2009153567 | 12/2009 |
| WO | 2011147882 | 12/2011 |
| WO | 2013014440 | 1/2013 |

* cited by examiner

US 9,260,931 B2

RISER BREAKAWAY CONNECTION AND INTERVENTION COUPLING DEVICE

CROSS-REFERENCE TO RELATED APPLICATIONS

This application claims the benefit of priority from U.S. Provisional Application No. 61/776,051, filed Mar. 11, 2013.

STATEMENT REGARDING FEDERALLY SPONSORED RESEARCH OH DEVELOPMENT

Not applicable.

BACKGROUND

The invention relates generally to subsea drilling risers. More particularly, the invention relates to breakaway connections for subsea risers and intervention devices and Methods disconnection of subsea risers.

In offshore drilling operations a riser is employed to flow mud returns from a borehole extending from the sea floor to a drilling vessel or rig disposed at the sea surface. The upper end of the riser is connected to the drilling vessel and the lower end of the riser is connected to a lower marine riser package (LMRP) that is mounted to a subsea blowout preventer (BOP) secured to a wellhead at the sea floor. The upper end of the riser is effectively fixed to the drilling vessel and the lower end of the riser is effectively fixed to the sea floor, and the riser is typically placed in tension therebetween.

Although drilling vessels employ dynamic positioning (DP) systems to maintain their positions relative to the corresponding subsea wellheads, drilling vessels do experience heave and lateral movements in response to wind and waves at the surface. Consequently, risers often experience variations in tensile loads, bending moments, and torsional loads during offshore drilling operations. In an extreme scenario, a failure or malfunction of a DP system may cause a drilling vessel to drift off location, thereby applying drastic increases in the tensile loads applied to the associated riser. If the tensile, bending, and/or torsional load capacity of such a riser is exceeded, it may break. Upon breaking, the upper portion of the riser attached to the drilling vessel will be supported by and suspended from the drilling vessel, however, the lower portion of the riser attached to the LMRP is unsupported, and thus, will fall down to the sea floor. The fallen lower portion can damage subsea equipment such as the LMRP or BOP, or wellhead, as well as create a tangled mess of debris around the LMRP, BOP, and wellhead. Damage to the subsea equipment and tangled debris may undesirably obstruct and/or limit subsequent remedial operations.

Failure analysis of several conventional riser systems suggests the weak links in riser systems is often at the connection between the upper end of the riser and the drilling vessel. A break at this point of a riser is particularly problematic as the unsupported lower portion of the riser that ails to the sea floor represents almost 100% of the total length of the riser. The long length of the separated lower portion and associate mass enhances the likelihood of damaging subsea equipment and creating obstacles that may interfere with subsequent remedial operations.

BRIEF SUMMARY OF THE DISCLOSURE

These and other needs in the art are addressed in one embodiment by a breakaway connection for a subsea riser. In an embodiment, the breakaway link comprises a tubular stabbing member having a central axis, an upper end, a radially outer cylindrical surface, a radially inner surface, and an annular recess in the outer cylindrical surface. In addition, the breakaway link comprises a tubular female member having a central axis, a lower end, a radially outer surface, a radially inner surface defining a receptacle extending axially from the lower end, and a plurality of circumferentially-spaced threaded holes extending radially from the radially outer surface to the receptacle; wherein the stabbing member is disposed in the receptacle and coaxially aligned with the female member. Further, the breakaway link comprises a plurality of shear pins, wherein each shear pin is threadably disposed in one threaded hole, and wherein each shear pin has a radially inner end seated in the annular recess.

These and other needs in the art are addressed in another embodiment by a subsea connection. In an embodiment, the subsea connection comprises an upward facing tubular stabbing member coupled to a subsea riser flex joint, the stabbing member having a central axis, an upper end, a radially inner surface extending from the upper end, and a radially outer surface extending from the upper end. In addition, the subsea connection comprises a locking overshot coaxially disposed about the upper end of the stabbing member and releasably locked onto the stabbing member, the locking overshot including a tubular body having a lower end, a radially inner surface extending from the lower end, and a radially outer surface extending from the lower end. Further, the subsea connection comprises an annular locking ring disposed in an annulus radially positioned between the stabbing member and the body, wherein the locking ring includes an annular cage and a plurality of circumferentially-spaced locking balls retained by the cage, wherein the annulus has a width W measured radially between the stabbing member and the body, and wherein the width W decreases moving axially downward toward the lower end of the body. Still further, the subsea connection comprises a biasing member disposed within the annulus and configured to bias the locking ring axially toward the lower end of the body.

These and other needs in the art are addressed in another embodiment by a method comprising connecting a first section of a riser extending subsea from a surface vessel to a second section of the riser coupled to a subsea LMRP with a breakaway connection. In addition, the method comprises configuring the breakaway connection to separate at a predetermined tensile load applied to the riser.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
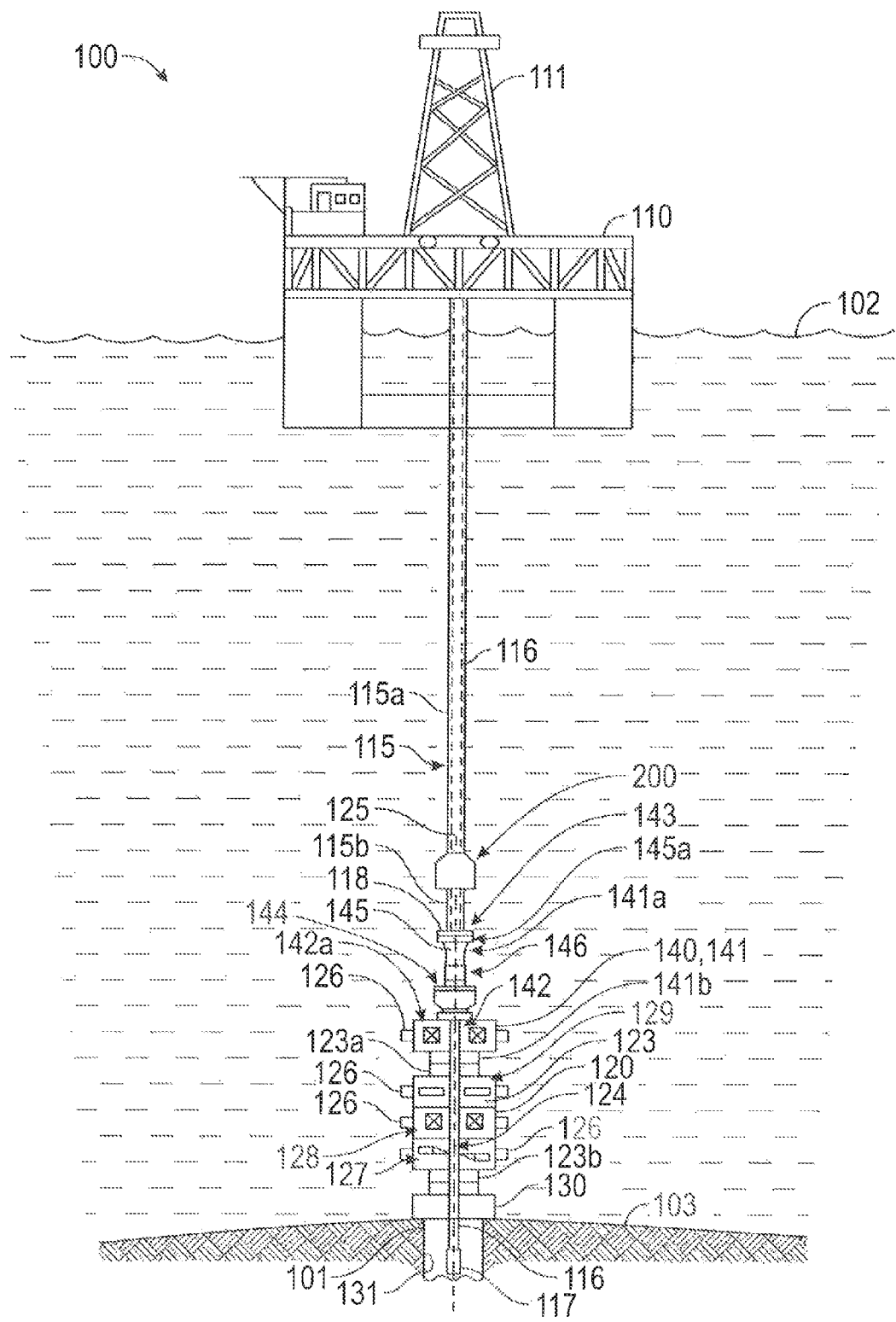
FIG. 1 is a schematic view of an embodiment of an offshore drilling system including an embodiment of a riser breakaway link in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Referring now to FIG. 1, an embodiment of an offshore system 100 for drilling and/or producing a wellbore 101 is shown. In this embodiment, system 100 includes an offshore platform 110 at the sea surface 102, a subsea blowout preventer (BOP) 120 mounted to a wellhead 130 at the sea floor 103, and a lower marine riser package (LMRP) 140. Platform 110 is equipped with a derrick 111 that supports a hoist (not shown). While the platform 110 is shown in FIG. 1 as a semi-submersible, any suitable floating platform (e.g., tension-leg platform, a spar platform, or a drillship) can be used in connection with embodiments disclosed herein. A drilling riser 115 extends from platform 110 to LMRP 140. In general, riser 115 is a large-diameter pipe that connects LMRP 140 to the floating platform 110. During drilling operations, riser 115 takes mud returns to the platform 110. Casing 131 extends from wellhead 130 into subterranean wellbore 101.

Downhole operations are carried out by a tubular string 116 (e.g., drillstring, production tubing string, coiled tubing, etc.) that is supported by derrick 111 and extends from platform 110 through riser 115, LMRP 140, BOP 120, and into cased wellbore 101. A downhole tool 117 is connected to the lower end of tubular string 116. In general, downhole tool 117 may comprise any suitable downhole tool(s) for drilling, completing, evaluating and/or producing wellbore 101 including, without limitation, drill bits, packers, testing equipment, perforating guns, and the like. During downhole operations, string 116, and hence tool 117 coupled thereto, may move axially, radially, and/or rotationally relative to riser 115, LMRP 140, BOP 120, and casing 131.

BOP 120 and LMRP 140 are configured to controllably seal wellbore 101 and contain hydrocarbon fluids therein. Specifically, BOP 120 has a central or longitudinal axis 125 and includes a body 123 with an upper end 123a releasably secured to LMRP 140, of lower end 123b releasably secured to wellhead 130, and a main bore 124 extending axially between upper and lower ends 123a, b. Main bore 124 is coaxially aligned with wellbore 101, thereby allowing fluid communication between wellbore 101 and main bore 124. In addition, BOP 120 includes a plurality of axially stacked sets of opposed rams—opposed blind shear rams or blades 127 for severing tubular string 116 and sealing off wellbore 101 from riser 115, opposed blind rams 128 for sealing off wellbore 101 when no string (e.g., string 116) or tubular extends through main bore 124, and opposed pipe rams 129 for engaging string 116 and sealing the annulus around tubular string 116. Each set of rams 127, 128, 129 is equipped with sealing members that engage to prohibit flow through the annulus around string 116 and/or main bore 124 when rams 127, 128, 129 is closed. Thus, each set of rams 127, 128, 129 functions as a sealing mechanism.

Opposed rams 127, 128, 129 are disposed in cavities that intersect main bore 124 and support rams 127, 128, 129 as they move into and out of main bore 124. Each set of rams 127, 128, 129 is actuated and transitioned between an open position and a closed position. In the open positions, rams 127, 128, 129 are radially withdrawn from main bore 124 and do not interfere with tubular string 116 or other hardware that may extend through main bore 124. However, in the closed positions, rams 127, 128, 129 are radially advanced into main bore 124 to close off and seal main bore 124 (e.g., rams 127, 128) or the annulus around tubular string 116 (e.g., rams 129). Each set of rams 127, 128, 129 is actuated and transitioned between the open and closed positions by a pair of actuators 126. In particular, each actuator 126 hydraulically moves a piston within a cylinder to move a drive rod coupled to one ram 127, 128, 129.

Referring still to FIG. 1, DART 140 has a body 141 with an upper end 141a connected to the lower end of riser 115, a lower end 141b releasably secured to upper end 123a of BOP 120, and a throughbore 142 extending between upper and lower ends 141a, b. Throughbore 142 is coaxially aligned with main bore 124 of BOP 120, thereby allowing fluid communication between throughbore 142 and main bore 124. LMRP 140 also includes an annular blowout preventer 142a comprising an annular elastomeric sealing element that is mechanically squeezed radially inward to seal on a tubular extending through bore 142 (e.g., string 116, casing, drillpipe, drill collar, etc.) or seal off bore 142. Thus, annular BOP 142a has the ability to seal on a variety of pipe sizes and seal off bore 142 when no tubular is extending therethrough.

In this embodiment, upper end 141a of LMRP 140 comprises a riser flex joint 143 that allows riser 115 to deflect angularly relative to BOP 120 and LMRP 140 while hydrocarbon fluids flow from wellbore 101, BOP 120 and LMRP 140 into riser 115. In this embodiment, flex joint 143 includes a cylindrical base 144 rigidly secured to the remainder of LMRP 140 and a riser extension or adapter 145 extending upward from base 144. A fluid flow passage 146 extending through base 144 and adapter 145 defines the upper portion of throughbore 142. A flex element (not shown) disposed within base 144 extends between base 144 and riser adapter 145, and sealingly engages both base 144 and riser adapter 145. The flex element allows riser adapter 145 to pivot and angularly deflect relative to base 144, LMRP 140, and BOP 120. In this embodiment, upper end of adapter 145 comprises an annular flange 145a connected to a mating annular flange 118 disposed at the lower end of riser 115. In addition, riser 115 includes a riser breakaway connection or link 200 positioned axially adjacent flange 118. As will be described in more detail below, riser breakaway connection 200 defines a predetermined location along riser 115 at which riser 115 will disconnect at a predetermined tensile load.

Referring still to FIG. 1, at the surface 102, wind and wave forces act on platform 110 and cause platform 110 to move relative to wellhead 130. However, platform 110 is equipped with an anchoring or dynamic positioning (DP) system that limits its movement relative to wellhead 130 to an allowable degree. As is known in the art, DP systems employ a plurality of thrusters disposed about the hub of a vessel (e.g., platform 110), which continuously operate to adjust the vessel's position at the sea surface 102 in response to wind and wave action. However, in extreme weather (e.g., hurricane) the DP system may not be able to maintain the position of platform 110. Further, in rare instances, a malfunction of the DP system or an inadvertent human error may allow platform. 110 to drift away from the preferred position over wellhead 130. As platform 110 moves offsite, the tensile loads applied to riser 115 increase. If the loads are sufficiently large, riser 115 can break. As previously described, a conventional riser may break at any location between its upper and lower ends, but is particularly vulnerable to break at its upper end connected to the surface platform. A break at the upper end of a riser can result in a very long section of the riser (e.g., more than a mile long) failing to the sea floor, potentially damaging subsea equipment disposed at the sea floor and/or creating obstructions that interfere with remedial operations.

However, in the embodiments described herein, riser 115 has a first or upper section 115a extending from the platform 110, and a second or lower section 115b extending from the riser adapter 145 of the flex joint 143. A riser breakaway connection 200 couples the upper section 115a to the lower section 11b and is positioned substantially adjacent to the riser adapter 145. However, in other embodiments, riser connection 200 may be positioned anywhere along the riser 115, such that connection 200 may not be adjacent to or near the riser adapter 145 of flex joint 143. Riser breakaway connection 200 enables the disconnection of the lower section 115b from the upper section 115a at a predetermined tensile load on riser 115. By positioning connection 200 adjacent to or near the connection point between the riser adapter 145 of the flex joint 143, substantially the entire length of riser 115 will be supported and suspended from platform 110 upon disconnection, thereby avoiding a long section of riser 115 failing to the sea floor 103 and associated problems (e.g., damage to subsea equipment, creation of obstructions that interfere with remedial operations, etc.). It should be appreciated that excessive tensile loads on a riser 115, even if insufficient to break the riser, may damage and/or bend subsea equipment connected to the riser (e.g., bend the wellhead). Thus, the predetermined load at which breakaway connection 200 disconnects riser 115 from flex joint 143 can be set below the load at which riser 115 may actually sever.

Figure 2:
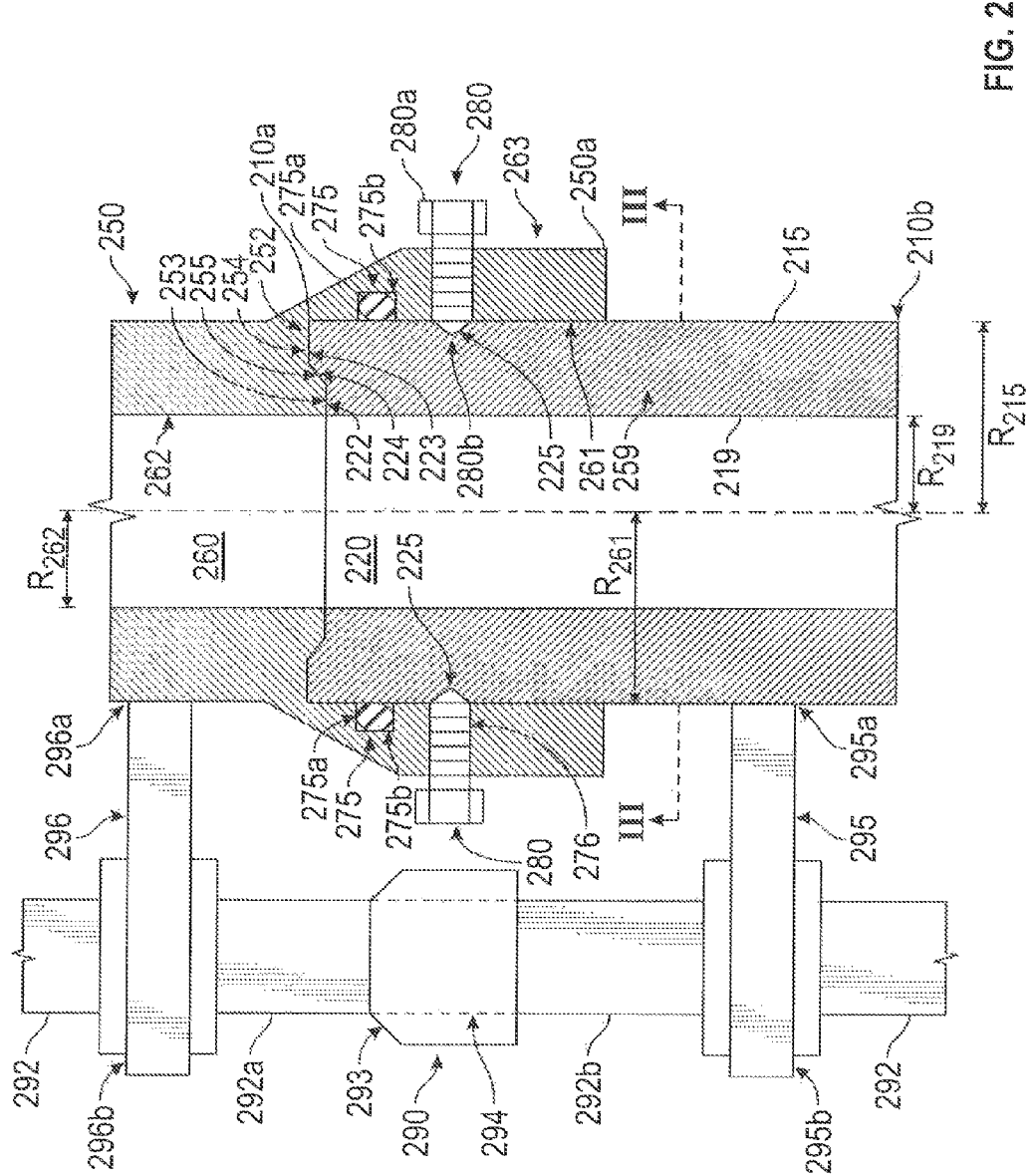
FIG. 2 is a partial longitudinal cross-sectional view of the riser breakaway link of FIG. 1.

Referring now to FIG. 2, breakaway connection 200 is disposed along riser 115 and comprises a male stabbing member or section 210, a female receiving member or section 250 that receives male section 210, a plurality of shear pins 280 extending radially through female section 250 and into engagement with male section 210 disposed therein, and an annular seal assembly 275 radially disposed between sections 210, 250. In this embodiment, male section 210 defines the upper end of a lower section 115b of riser 115 and female section 250 defines the lower end of an upper section 115a of riser 115. However, in other embodiments, the male section (e.g., male section 210) can define the upper end of the flex joint adapter (e.g., adapter 1451 and the female section (e.g., female section 250) can define the lower end of the riser (e.g., riser 115).

In this embodiment, male section 210 is a rigid tubular having an upper end 210a, a radially outer surface 215 disposed at a radius $R_{215}$, and a radially inner surface 219 disposed at a radius $R_{219}$, each surface 215, 219 extending axially downward from upper end 210a. Cylindrical outer surface 215 includes an annular recess 225 that, as will be described in more detail below, engages pins 280. Cylindrical inner surface 219 defines a throughbore 220 extending axially from upper end 210a through male section 210.

Upper end 210a of male section 210 includes an annular recess 222 extending radially from inner surface 219. Recess 222 results in the formation of a raised annular lip 223 extending radially from outer surface 215. An annular frustoconical surface 224 extends radially between recess 222 and lip 223. As will be described in more detail below, upper end 210a engages a mating shoulder within female section 250.

Referring still to FIG. 2, female section 250 is coaxially aliped with male section 210. In this embodiment, female section 250 is a rigid tubular having a lower end 250a, a radially outer surface 257, and a radially inner surface 259, each surface 257, 259 extending axially upward from end 250a. Inner surface 259 includes a first cylindrical surface 261 extending axially from lower end 250a, a second cylindrical surface 262, and an annular shoulder 252 extending radially therebetween. First cylindrical surface 261 is disposed at a radius $R_{261}$, and second cylindrical surface 262 is disposed at a radius $R_{262}$ that is less than radius resulting in shoulder 252 extending therebetween.

First cylindrical surface 261 defines a receptacle 263 at lower end 250a that receives male section 210. In particular, radius $R_{261}$ is substantially the same or slightly less than radius $R_{215}$, and thus, surfaces 215, 261 slidingly engage. Male section 210 is disposed in receptacle 263 with end 210a axially abutting shoulder 252. In this embodiment, shoulder 252 has a profile that mates and engages end 210a of male section 210. Specifically, shoulder 252 has an annular recess 254 extending radially inward from first cylindrical surface 261, a raised lip 253 extending radially outward from second cylindrical surface 262, and an annular frustoconical surface 255 extending radially from lip 253 to recess 254. Lip 253 of shoulder 252 is seated in recess 222 at end 210a and lip 223 at end 210a is seated in recess 254 of shoulder 252 with frustoconical surfaces 224, 255 in contact with one another.

Second cylindrical surface 262 defines a throughbore 260 in female section 250. Radius $R_{262}$ is the same as radius $R_{219}$, and thus, when end 210a is seated against shoulder 252, throughbore 260 of female section 250 is contiguous with throughbore 220 of male section 210.

Referring still to FIG. 2, a plurality of uniformly circumferentially-spaced threaded bores 276 extending radially through female section 250 from outer surface 257 to first cylindrical surface 261. Shear pins 280 are threadably disposed in bores 267, each pin 280 having a first or radially outer end 280a disposed outside female section 250 and a second or radially inner end 280b seated in annular recess 225 of male section 210. Inner ends 280b are shaped to mate with annular recess 225. In this embodiment, ends 280b are generally conical and recess 225 has a generally triangular cross-section. Since shear pins 280 threadingly engage bores 276, they may be radially advanced into and out of engagement with recess 225.

Referring again to FIG. 2, annular seal assembly 275 is disposed between sections 210, 250 to prevent fluid in throughbores 220, 260 from leaking into the surrounding environment. In this embodiment, seal assembly 275 comprises an annular seal member 275a seated in an annular seal gland or recess 275b in cylindrical surface 261 of female section 250. The radially inner surface of seal member 275a sealingly engages male section 210 and the radially outer surface of seal member 275b sealingly engages female section 250. Although seal member 275a is shown as an O-ring seal in FIG. 2, in general, the seal member (e.g., seal member 275a) may comprise other types of annular seals including, without limitation, a square seal, a lip seal, or the like. In this embodiment, seal member 275a is made of an elastomeric material, however, in other embodiments, a metal seal can be employed.

Figure 3:
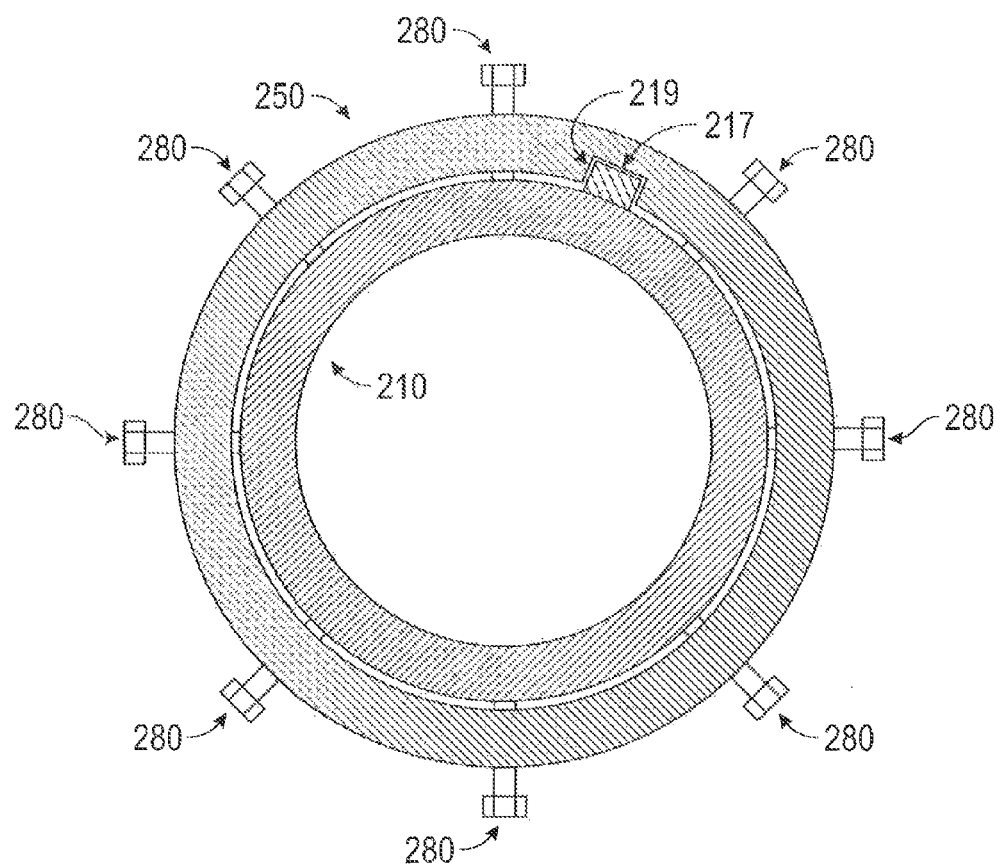
FIG. 3 is a cross-sectional bottom view of the riser break away link of FIG. 2 taken along section III-III of FIG. 2.

As best Shown in FIG. 3, in this embodiment, male section 210 includes an elongate key 217 extending radially outward from surface 215 and extending axially from upper end 210a, and female section 250 includes an elongate slot 219 extending radially inward from cylindrical surface 261 and extending axially from lower end 250a. Key 217 mates with slot 219 and is disposed therein, thereby preventing rotation of male section 210 relative to female section 250 in a manner similar to mating splines.

Referring now to FIG. 2, in making up connection 210 male section 210 is advanced within receptacle 263 until the upper end 210a axially abuts the shoulder 252. Pins 280 are then advanced through bores 276 such that the radially inner ends 280b are seated within the recess 225. If recess 225 is slightly misaligned with ends 280b, radial advancement of pins 280 and sliding engagement of ends 280b and recess 225 will move end 210a into axially engagement with shoulder 252 and bring recess 225 into alignment with ends 280b. Additionally, engagement of ends 280b with recess 225 facilitates or enhances engagement between frustoconical surfaces 224, 255, thereby reducing the risk of fatigue failures within the connection 200.

Referring now to FIGS. 2 and 3, once connection 200 is made up as described above, the connection 200 may then be severed or broken up in response to a pre-determined tensile load applied thereto. Specifically, the size, number, and material composition of shear pins 280 can be selected such that ends 280b of shear pins 280 will shear off in response to a predetermined tensile load applied to connection 200. Thus, by changing the size, number, material composition or combinations thereof of pins 280, the tensile load at which female section 250 will disengage male section 210 can be tailored and controlled. In general, the greater the diameter of shear pins 280, the greater the number of shear pins 280, and the greater the hardness of shear pins 280, the greater the tensile load at which ends 280b will be sheared, thereby allowing female section 250 to disengage male section 210. As best shown in FIG. 3, in this embodiment, eight uniformly circumferentially-spaced shear pins 280 are employed. However, in general, any suitable number and spacing of the shear pins (e.g., shear pins 280) can be employed. It should also be appreciated that excessive tensile loads on a riser 115, even if insufficient to break the riser 115, may damage and/or bend subsea equipment connected to the riser 115 (e.g., bend the wellhead). Thus, the predetermined load at which the male section 210 separates or breaks away from the female section 250 within connection 200 can be set below the load at which riser 115 may actually sever.

As is known in the art, auxiliary lines such as choke/kill lines typically extend along the outside of the riser from the surface to the subsea LMRP and BOP. If the riser breaks, the auxiliary lines may also break in an uncontrolled manner and location. Accordingly, in embodiments described herein, an auxiliary line breakaway connection or link is preferably employed in connection with connection 200 for each auxiliary line. Referring again to FIG. 2, an embodiment of an auxiliary line breakaway connection or link 290 is shown in conjunction with riser breakaway connection 200. Auxiliary line breakaway connection 290 is provided along auxiliary line 292 proximal connection 200, and allows breakup of auxiliary line 292 radially adjacent connection 200 upon breakup of connection 200. In particular, connection 290 releasably connects the lower end of an upper section 292a of line 292 to an upper end of a lower section 292b of line 292.

In this embodiment, auxiliary line breakaway connection 290 allows fluid communication between sections 292a, b and comprises a female coupling 293 disposed at lower end of upper section 292a that slidably receives a mating male coupling 294 disposed at upper end of lower section 292b. One or more annular seal assemblies (not shown) are radially disposed between couplings 293, 294 to prevent fluid flowing therethrough from leaking into the surrounding environment. A first support arm 296 extends radially from female section 250 to upper section 292a axially above female coupling 293 and a second support arm 295 extends radially from male section 210 to lower section 292b axially below male coupling 294. Arm 294 has a first end 296a fixed to female section 250 and a second end 294b fixed to upper section 292a, and arm 295 has a first end 295a fixed to male section 210 and a second end 295b fixed to lower section 292b. Couplings 293, 294 slidingly engage and are not locked together, and thus, axial movement of female section 250 relative to male section 210 will result in axial movement of female coupling 293 relative to male coupling 294. Thus, with couplings 293, 294 coaxially aligned, makeup of connection 200 will result in makeup of connection 290, and breakup of connection 200 will result in breakup of connection 290.

In the manner described, connection 200 allows breakup of the upper section 115a and the lower section 115b of riser 115 at a predetermined location and at a predetermined tensile load. However, following disconnection of sections 210, 250, it may be desirable to reconnect to male section 210 as part of an intervention or remedial operations. For example, if BOP 120 and LMRP 140 are unable to shut in wellbore 101, it may be desirable to connect a capping stack or other containment device to upward facing male section 210.

Figure 4:
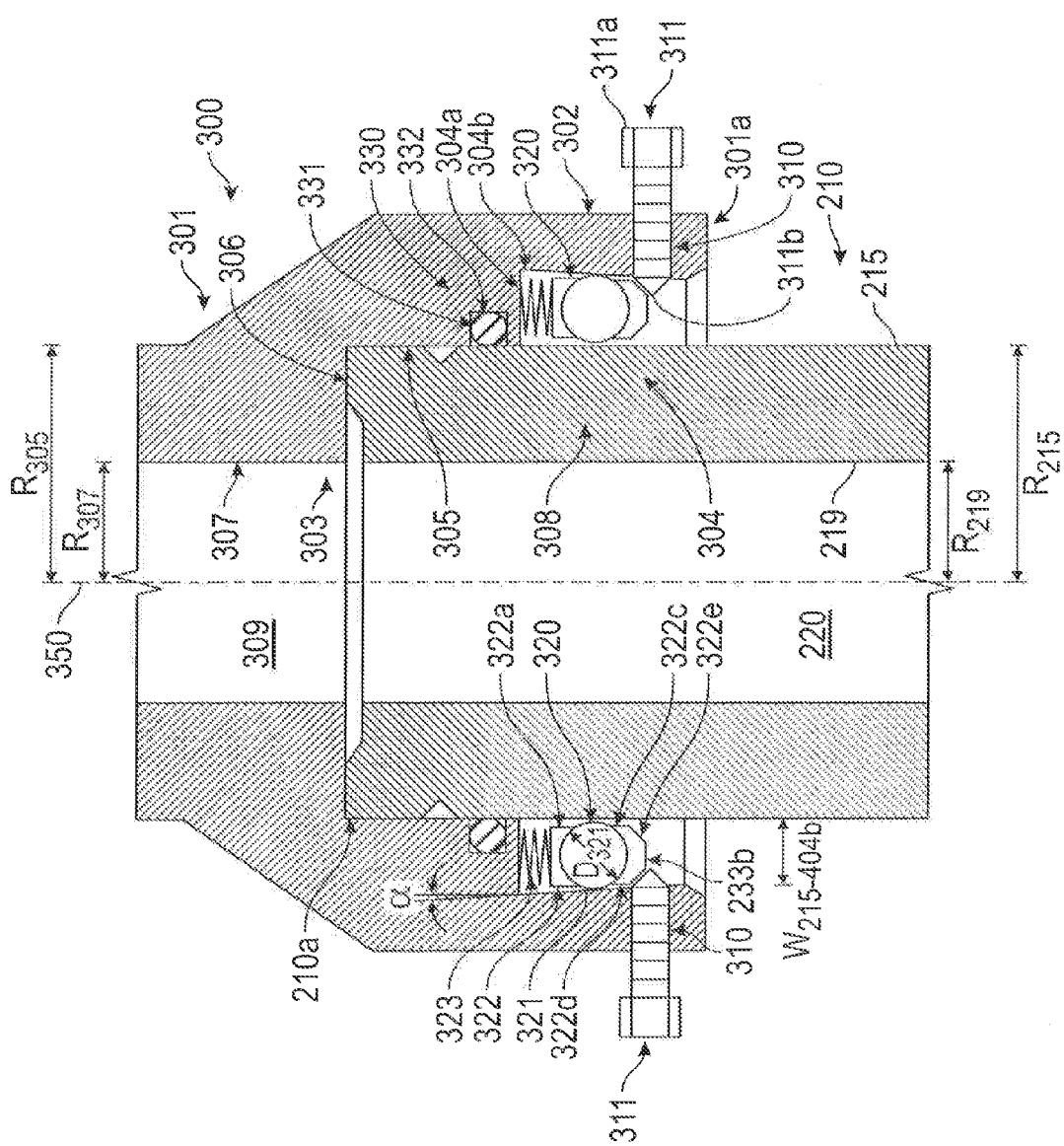
FIG. 4 shows a partial cross-sectional view of an embodiment of an overshot coupling in accordance with the principles disclosed herein for releasably attaching to the male section of FIG. 2 following the disconnection of female section.

Referring now to FIG. 4, an embodiment of a female locking overshot 300 releasably secured to upward facing male section 210 previously described following disconnection and removal of female section 250 is shown. In general, overshot 300 can be disposed at the lower end of a capping stack or other containment device to releasably connect such capping stack or device to male section 210.

Overshot 300 has a central axis 350 and includes a generally tubular body 301, an annular locking ring 320 disposed within body 301, and an annular seal assembly 330. Body 301, locking ring 320, and seal assembly 330 are coaxially aligned with axis 350. Body 301 is a rigid tubular having a lower end 301a, a radially outer surface 302, and a radially inner surface 303, each surface 302, 303 extending axially upward from end 301a. Inner surface 303 includes an annular recess 304 extending axially upward from lower end 301a, a first cylindrical surface 305 extending axially upward from recess 304, an annular shoulder 306 extending radially inward from the upper end of cylindrical surface 305, and a second cylindrical surface 307 extending axially upward from shoulder 306. Thus, surface 305 extends axially between recess 304 and shoulder 306, and shoulder 306 extends radially between surfaces 305, 307. First cylindrical surface 305 is disposed at a radius $R_{305}$, and second cylindrical surface 307 is disposed at a radius $R_{307}$ that is less than radius $R_{305}$, resulting in shoulder 306 extending therebetween. Recess 304 extends radially outward relative to surface 305.

Recess 304 and first cylindrical surface 305 define a receptacle 308 at lower end 301a within which male section 210 is coaxially disposed. Radius $R_{305}$ is substantially the same or slightly less than radius $R_{215}$, and thus, surfaces 215, 305 slidingly engage. Male section 210 is disposed in receptacle 308 with end 210a axially abutting shoulder 306. Second cylindrical surface 307 defines a throughbore 309 in overshot 300. Radius $R_{307}$ is the same as radius $R_{219}$, and thus, when end 210a is seated against shoulder 306, throughbore 309 of overshot 300 is contiguous with throughbore 220 of male section 710.

Referring still to FIG. 4, recess 304 is defined by an upper planar shoulder 304a extending radially outward from surface 305 and a frustoconical surface 304b extending axially downward from shoulder 304a generally to end 301a. Frustoconical surface 304b tapers radially inward moving axially downward toward end 301a. Thus, the radius of surface 304b decreases moving axially downward from shoulder 304a, and the width $W_{215\text{-}404b}$ measured radially between outer surface 215 of male section 210 and surface 304b decreases moving axially downward from shoulder 304a. In this embodiment, surface 304b is oriented at an angle—of a relative to vertical. Angle α is preferably between 2° and 20°, and more preferably between 5° and 10°. In this embodiment, angle α is 8°.

Locking ring 320 is disposed within the recess 304, and thus, radially positioned between surface 304b and male section 210. In this embodiment, locking ring 320 comprises a plurality of uniformly circumferentially-spaced locking balls 321, an annular frame or cage 322 that supports and maintains the circumferential spacing of balls 321, and a plurality of circumferentially-spaced biasing members 323. Cage 322 has a first or upper end 322a, a second or lower end 322b, radially inner surface 322c, and a radially outer surface 322d. Lower end 322b is generally tapered. In particular, an annular bevel or frustoconical surface 322e is provided between lower end 322b and surface 322c, d, respectively.

Figure 5:
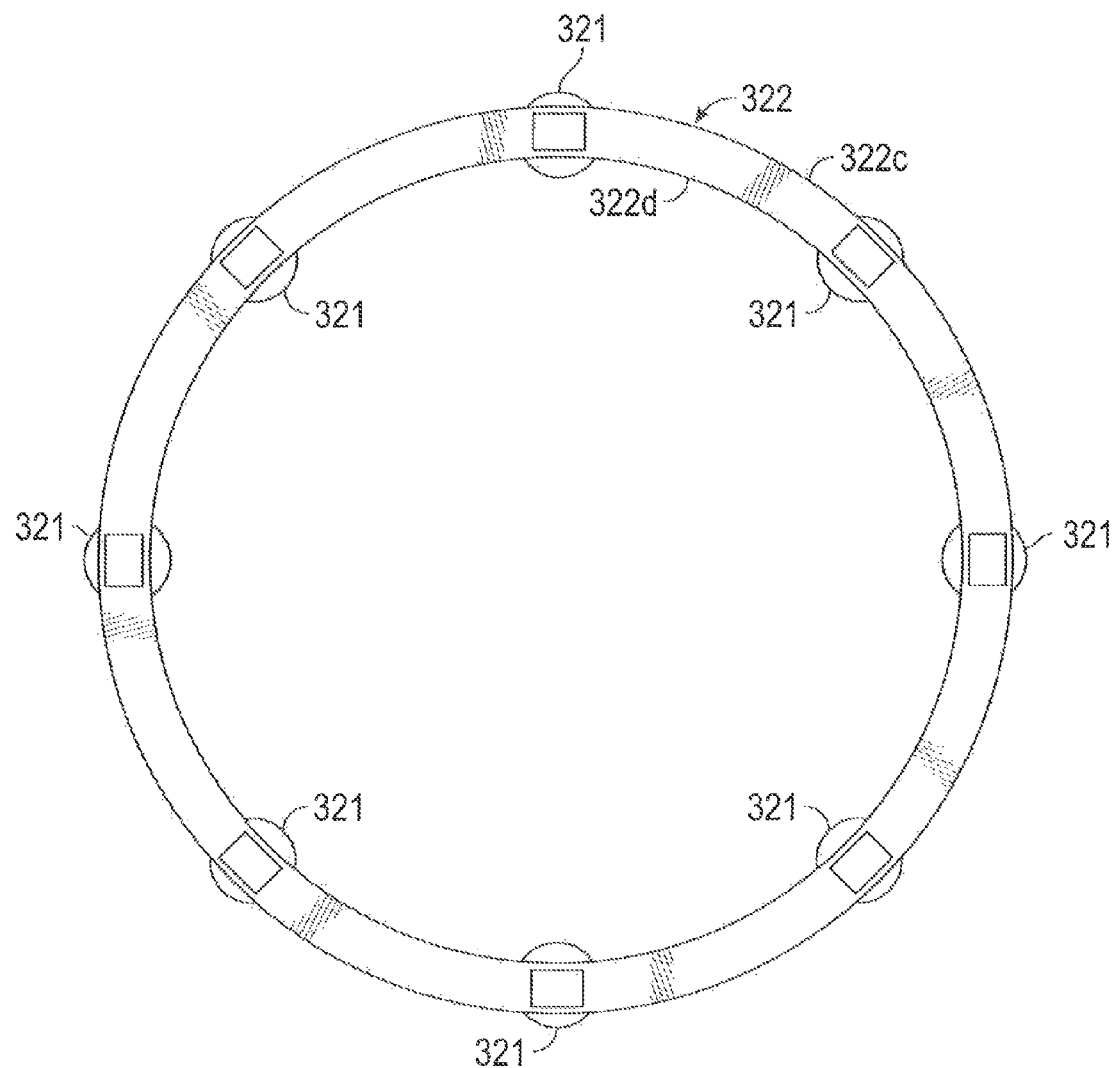
FIG. 5 is a top view of the locking ring of the overshot coupling of FIG. 4.

As best shown in FIGS. 4 and 5, balls 321 are housed within cage 322 and are generally free to rotate relative to cage 322. Further, each ball 321 has a diameter $D_{321}$ that is greater than the radial width of cage 322 measured between surfaces 322c, d. Thus, balls 321 extend radially inward from inner surface 322c and radially outward from outer surface 322d. In addition, diameter $D_{321}$ is less than the maximum width $W_{215\text{-}404b}$ at shoulder 304a and greater than the minimum width $W_{215\text{-}404b}$ at lower end 301a. Cage 322, with balls 321 disposed therein, is positioned within recess 304 and biasing members 323 are axially positioned between shoulder 304a and cage 322. Although eight uniformly circumferentially-spaced locking balls 321 are shown in FIG. 5, the number and spacing of the locking balls (e.g., balls 421) may be varied.

Referring again to FIG. 4, members 323 bias cage 322 and associated locking balls 321 axially downward within recess 304, thereby driving and wedging balls 321 between frustoconical surface 304b and male section 210. Wedging of balls 321 between surfaces 215, 304b resists overshot 300 from being pulled axially from male section 210. In this embodiment, biasing members 323 are coil springs.

A plurality of uniformly circumferentially spaced threaded bores 310 extending radially through body 301 from outer surface 302 to frustoconical surface 304b. Pins 311 are threadably disposed in bores 310, each pin 311 having a first or radially outer end 311a disposed outside body 301 and a second or radially inner end 311b extending slightly into recess 304. Inner ends 311b are shaped to mate with beveled surface 322e. In this embodiment, ends 311b are generally conical and, as previously described, surface 322e is frustoconical. Since pins 311 threadingly engage bores 310, ends 311b may be radially advanced into and out of engagement with surface 322e. As will be described in more detail below, as pins 311 are advanced radially outward, ends 311b move out of engagement with surface 322e, thereby allowing cage 322 to be biased downward and balls 321 to wedge between surfaces 215, 304b; and when pins 311 are advanced radially inward, ends 311b engage surface 322e and cage 322 axially upward within recess 304, thereby preventing balls 321 from being wedged between surfaces 215, 304b.

Referring still to FIG. 4, annular seal assembly 330 is disposed between body 301 and male section 210 to prevent fluids in throughbores 220, 309 from leaking into the surrounding environment. In this embodiment, seal assembly 330 comprises an annular seal member 331 seated in an annular seal gland or recess 332 in cylindrical surface 305. The radially inner surface of seal member 332 sealingly engages male section 210 and the radially outer surface of seal member 332 sealingly engages body 301. Although seal member 332 is shown as an O-ring seal in FIG. 4, in general, the seal member (e.g., seal member 332) may comprise other types of annular seals including, without limitation, a square seal, a lip seal, or the like. In this embodiment, seal member 332 is made of an elastomeric material, however, in other embodiments, a metal seal can be employed.

Referring still to FIG. 4, in making up the connection between overshot 300 and male section 210, male section 210 is advanced within receptacle 308 until the upper end 210a axially abuts the shoulder 306. As male section 210 is advanced within receptacle 306, balls 321 wedge between surfaces 215, 304b due to the downward bias exerted by members 323 on cage 322. Thus, once male section 210 is fully inserted within receptacle 308, overshot 300 is secured to the male section 210, such that any axial separation between the two is resisted.

Once the connection between overshot 300 and male section 210 is made up as described above, the connection may then be severed or broken up by advancing pins 311 radially inward. Specifically, pins 311 are advanced radially inward within bores 310 such that ends 311b engage the surfaces 322e and bias cage 322 axially upward within recess 304, thereby dislodging balls 321 from their engagement between surfaces 215, 304b. Once balls 321 are dislodged, the male section 210 may be withdrawn from the receptacle 308, thereby severing or breaking up the connection between the overshot 300 and the male section 210. In other embodiments, the upward/downward biasing of cage 322 within recess 304 may be hydraulically actuated in a manner known in the art. In such embodiments, the hydraulic actuation may be controlled either from the sea surface or subsea.

Figure 6:
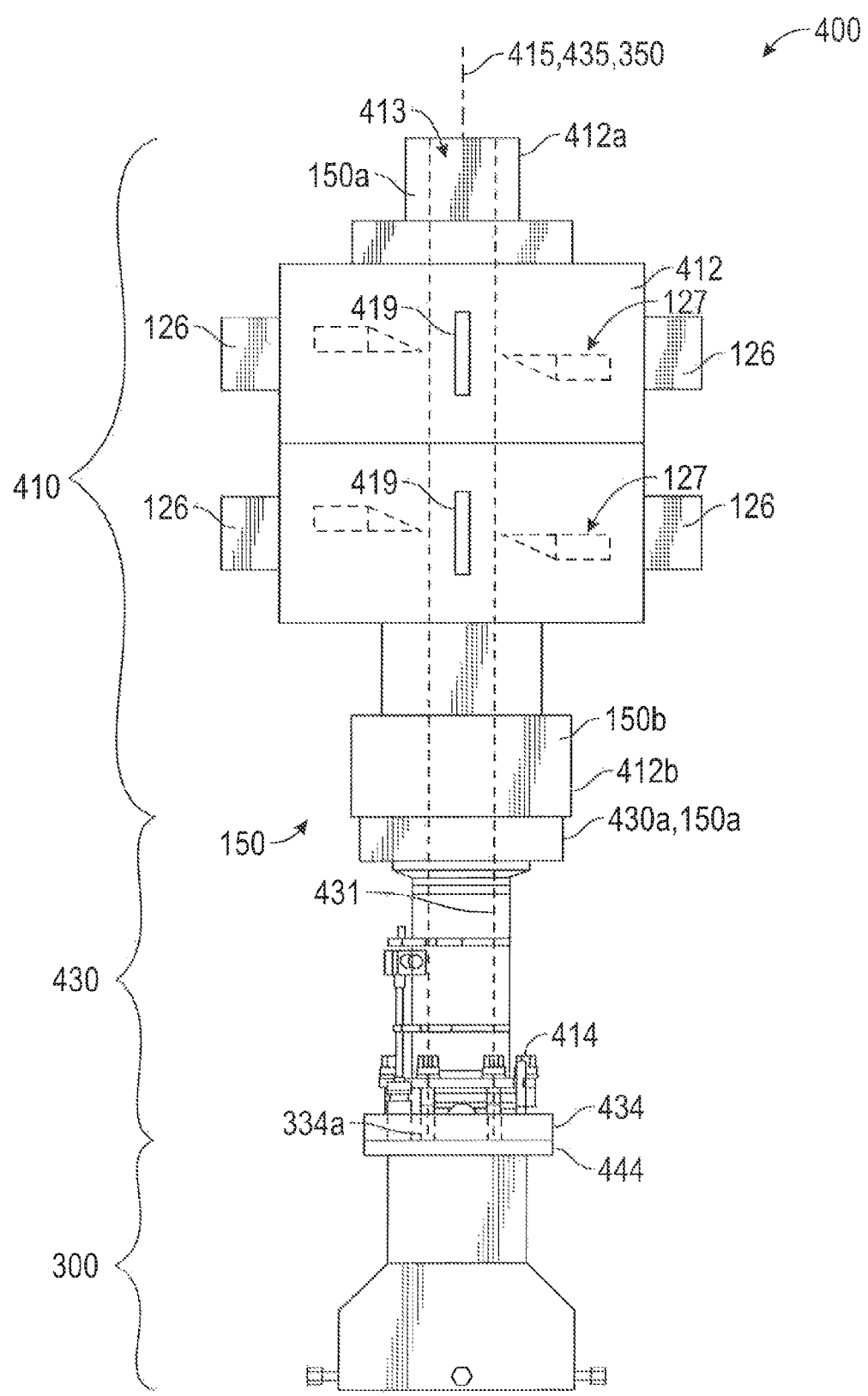
FIG. 6 is a side view of an embodiment of a capping stack including the overshot coupling of FIG. 5.
Figure 7:
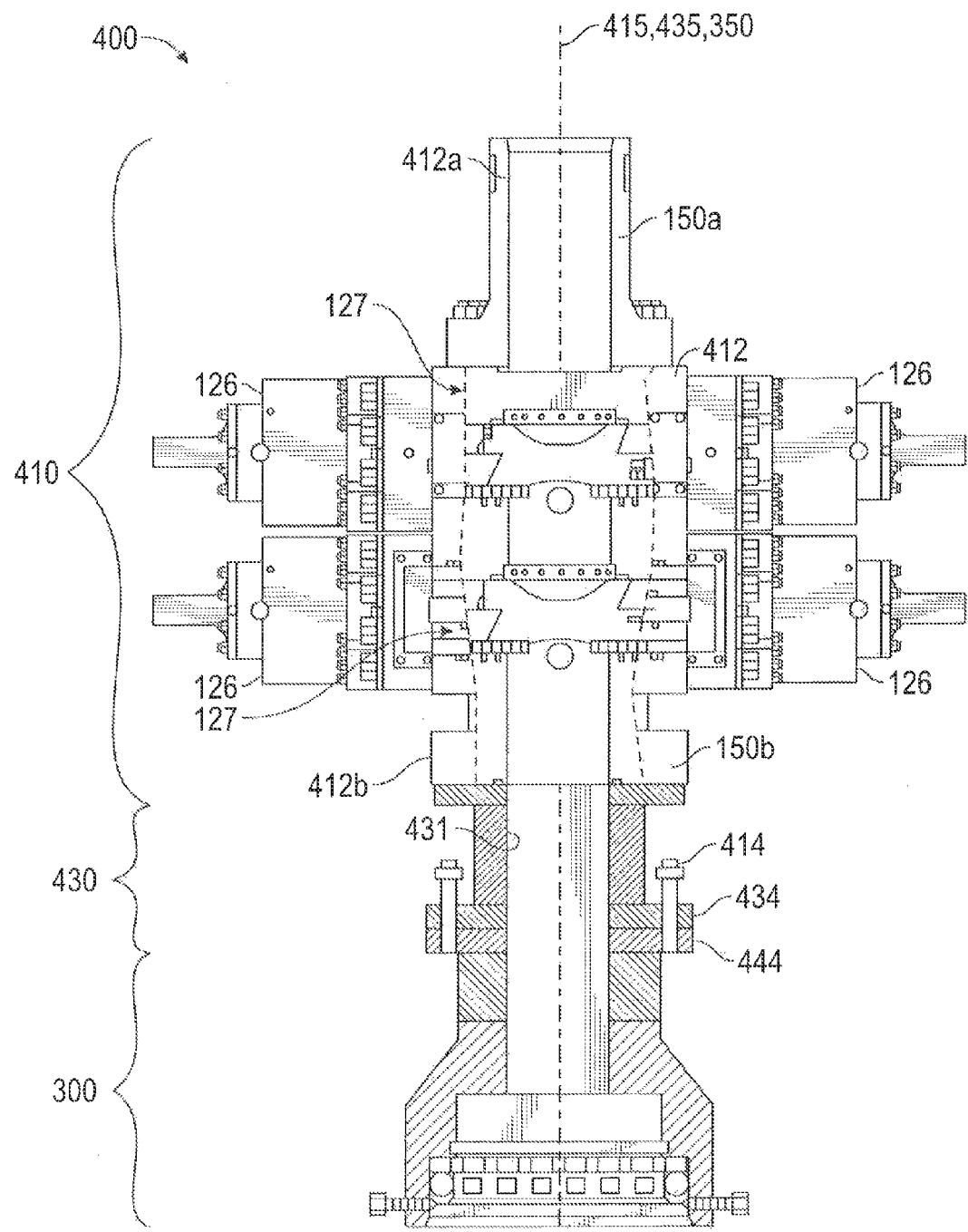
FIG. 7 is a side cross-sectional view of the capping stack of FIG. 6.

Referring now to FIGS. 6 and 7, an embodiment of a capping stack 400 including overshot 300 previously described is shown. In general, capping stack 400 can be used to cap and contain wellbore 101 following breakup of connection 200. In this embodiment, capping stack 400 comprises a BOP 410, a transition spool 430 coupled to BOP 410, and overshot 300 previously described coupled to the spool 430. The lower end of BOP 410 is releasably coupled to the upper end of transition spool 430 with a mechanical wellhead-type connecter 150, and the lower end of transition spool 430 is releasably coupled to the upper end of overshot 300 with a flange joint or connection 444.

BOP 410 is similar to BOP 120 previously described. Specifically, BOP 410 has a central or longitudinal axis 415 and includes a body 412 with a first or upper end 412a, a second or lower end 412b releasably secured to transition spool 430, and a main bore 413 extending axially between ends 412a, b. In this embodiment, upper end 412a comprises a male coupling 150a of a wellhead-type connector 150 and lower end 412b comprises a female coupling 150b of wellhead-type connector 150. In addition, BOP 410 also includes a plurality of axially stacked sets of opposed rams. However, in this embodiment, BOP 410 includes two sets of axially stacked sets of opposed rams—two sets of opposed blind shear rams or blades 127 as previously described, for sealing off wellbore main bore 413. Thus, as compared to relatively larger three ram BOPs (e.g., BOP 120), two ram BOP 410 may generally be considered a light weight BOP. Although this embodiment of BOP 410 includes two sets of blind shear rams 127, in other embodiments, the BOP (e.g., BOP 410) may comprise other types of opposed rams such as opposed blind rams (e.g., rams 128), pipe rams (e.g., rams 129), or combinations thereof.

Opposed rams 127 are disposed in cavities that intersect main bore 413 and support rains 127 as they move into and out of main bore 413. Each set of rams 127 is actuated and transitioned between an open position and a closed position. In the open positions, rams 127 are radially withdrawn from main bore 413 and do not interfere with any hardware that may extend through main bore 413. However, in the closed positions, rams 127 are radially advanced into main bore 413 to close off and seal main bore 413. Each set of rams 127 is actuated and transitioned between the open and closed positions by a pair of actuators 126 as previously described.

Referring specifically to FIG. 6, transition spool 430 has a central or longitudinal axis 435 (coaxially aligned with axis 415 when coupled to BOP 410), a first or upper end 430a releasably coupled to BOP 410, a second or lower end 430b, and a flow bore 431 extending axially between ends 430a, b. Flow bore 431 is coaxially aligned with main bore 413, thereby forming a continuous flow passage extending axially through capping stack 400. In this embodiment, upper end 430a comprises the male coupling 150a of wellhead-type connector 150. Lower end 430b comprises an annular flange 434. Flange 434 includes a plurality of circumferentially spaced holes 334a for receiving bolts 414 that secure transition spool 430 and capping stack 400 to a mating flange 444 disposed on overshot 300. Relatively long guide arms with T-handles 419 extend radially from BOP 410 and enable subsea manipulation of stack 400 with one or more subsea ROVs (e.g., ROVs 170 shown in FIGS. 8-8H) during deployment and installation of stack 400.

Referring now to FIGS. 8A-8H, capping stack 400 is shown being deployed and installed subsea on upward facing male section 210 to cap and contain a wellbore 101 emitting a plume 160 of fluid (e.g., hydrocarbon), following disconnection of riser 115 at breakaway connection 200. In this embodiment, capping stack 400 is installed in stages—transition spool 430 and overshot 300 are first deployed and installed subsea onto male section 210, and then, BOP 410 is deployed and installed subsea onto transition spool 430. The two stage installation approach is preferred since it allows the relatively light weight, transition spool 430 and overshot 300 suspended on wires 180 to be more precisely and easily manipulated subsea with ROVs 170 to achieve sufficient engagement with male section 210. However, in other embodiments, capping stack 400 may be installed in one stage as a single piece while still complying with the principles disclosed herein. Once transition spool 430 and overshot 300 are secured to male section 210, the upward facing wellhead connector coupling 150a is available for landing and connecting BOP 410, which is typically a more straight forward procedure similar to conventional subsea BOP installation operations. In FIGS. 8A-8D, transition spool 430 and overshot 300 coupled thereto are shown being controllably lowered subsea and secured to male section 210; and in FIGS. 8E-8H, BOP 410 is shown being controllably lowered subsea and secured to transition spool 430.

Figure 8A:
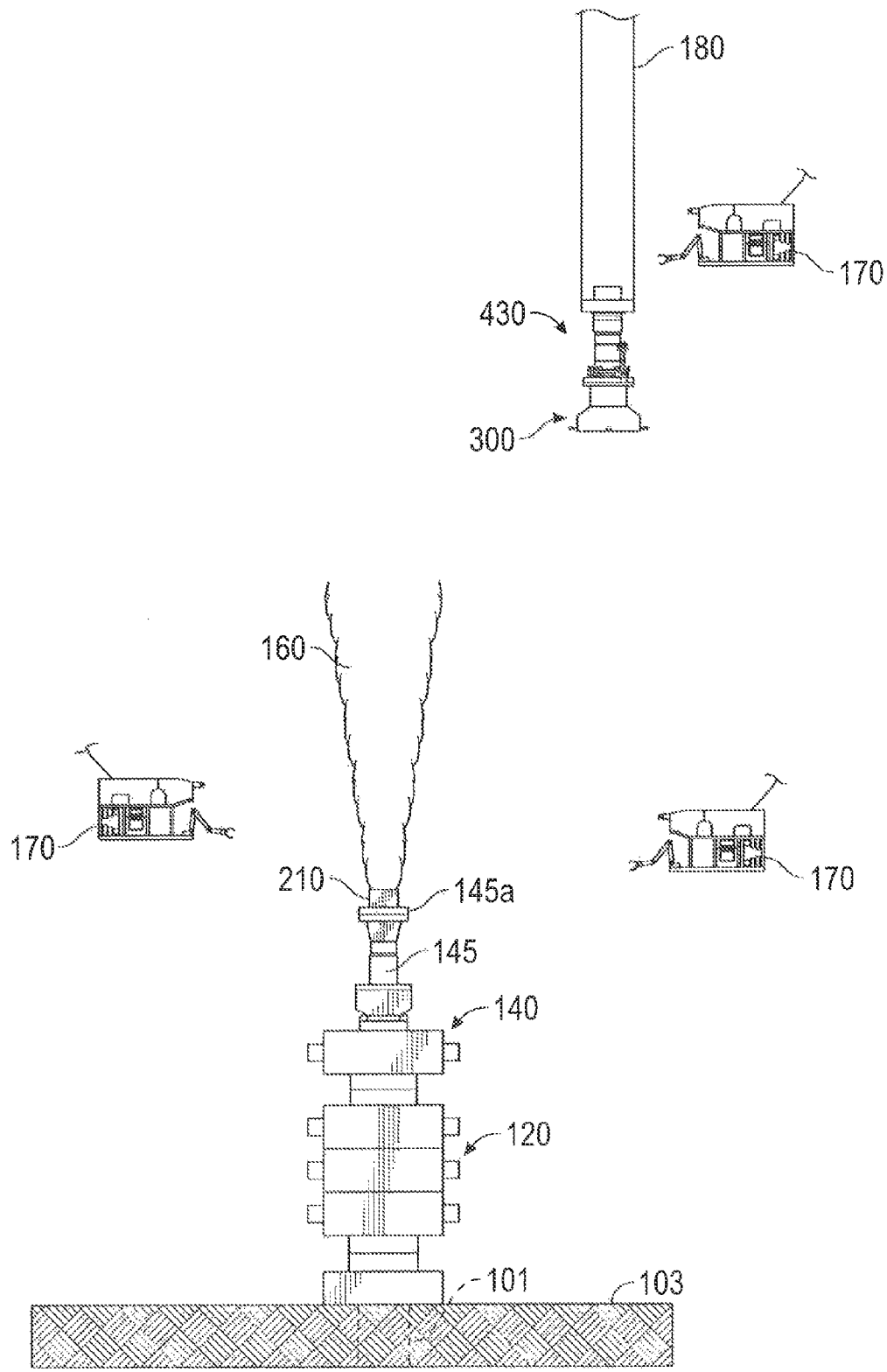
FIGS. 8A-8H are sequentially schematic views of the deployment and installation of the capping stack of FIG. 6 onto the male section of FIG. 2 following the disconnection of female section.
Figure 8B:
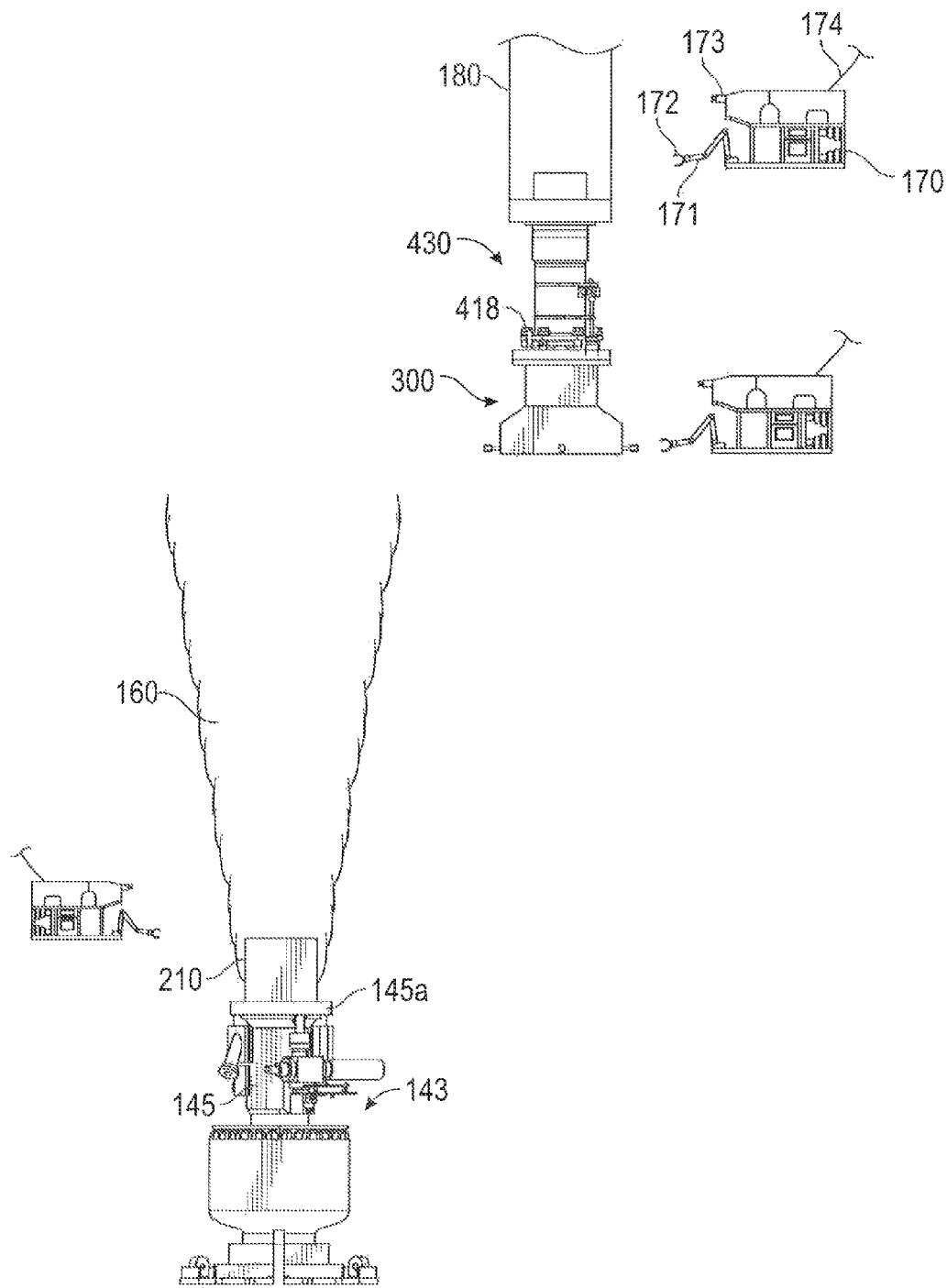

Referring first to FIG. 8A, transition spool 430 and overshot 300 are shown being controllably lowered subsea with a plurality of cables 180 secured to spool 430 and extending to a surface vessel. Due to the weight of spool 430, cables 180 are preferably relatively strong cables (e.g., steel cables) capable of withstanding the anticipated tensile loads. A winch or crane mounted to a surface vessel is preferably employed to support and lower spool 430 on cables 180. Although cables 180 are employed to lower spool 430 in this embodiment, in other embodiments, spool 430 may be deployed subsea on a pipe string. Using cables 180, spool 430 is lowered subsea under its own weight from a location generally above and laterally offset from wellbore 101, BOP 120, and LMRP 140 and outside of plume 160 to reduce the potential for hydrate formation within spool 430.

Figure 8C:
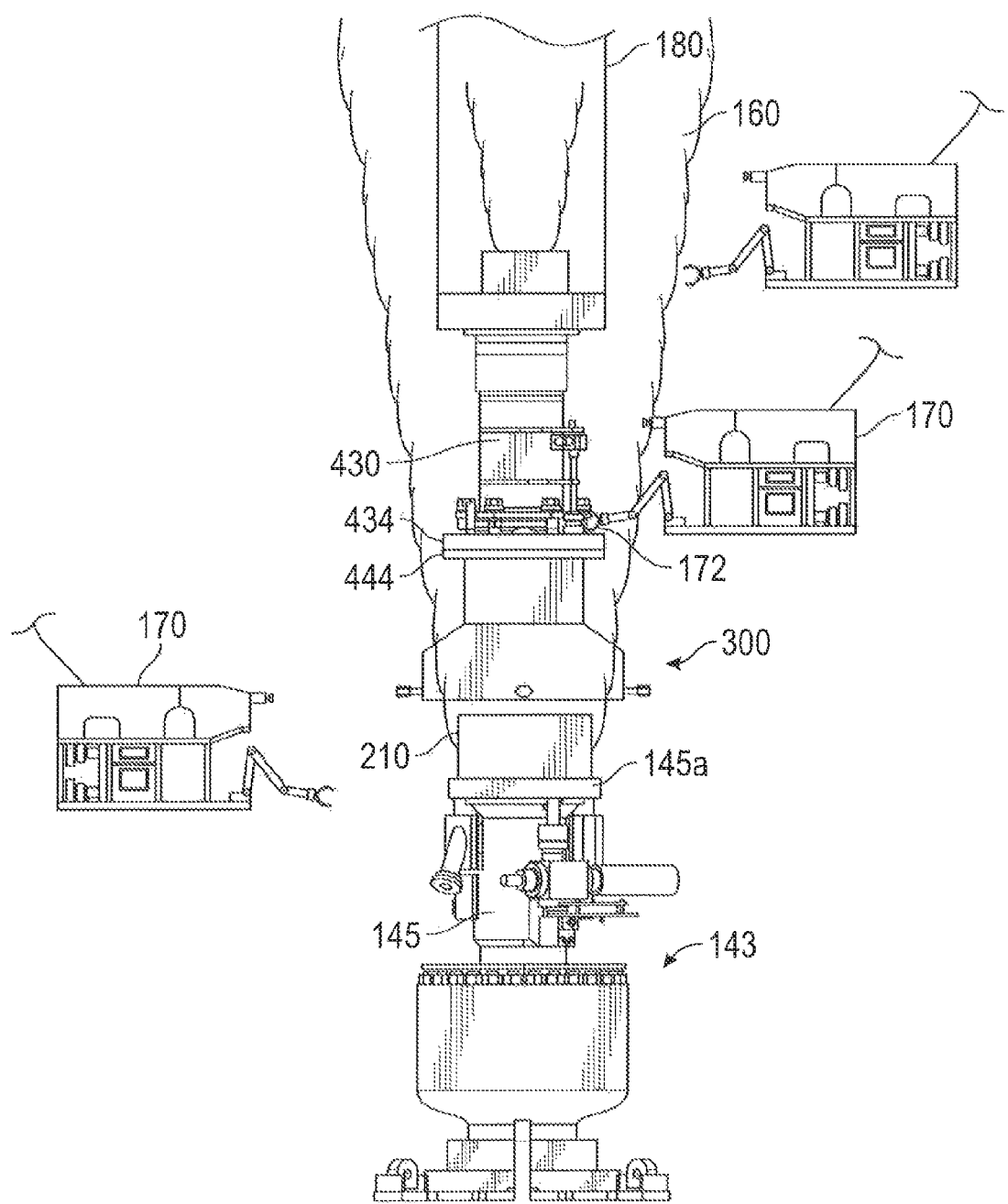

Moving now to FIG. 813, spool 430 is lowered laterally offset from male section 210 (outside of plume 160) until overshot 300 is slightly above male section 210. As spool 430 descends and approaches male section 210, ROVs 170 monitor the position of overshot 300 relative to male section 210. Next, as shown in FIG. 8C, spool 430 and overshot 300 are moved laterally into position immediately above male section 210. One or more ROVs 170 may utilize their claws 172 and handles 418 to guide and overshot 300 into the proper alignment relative with male section 210.

Figure 8D:
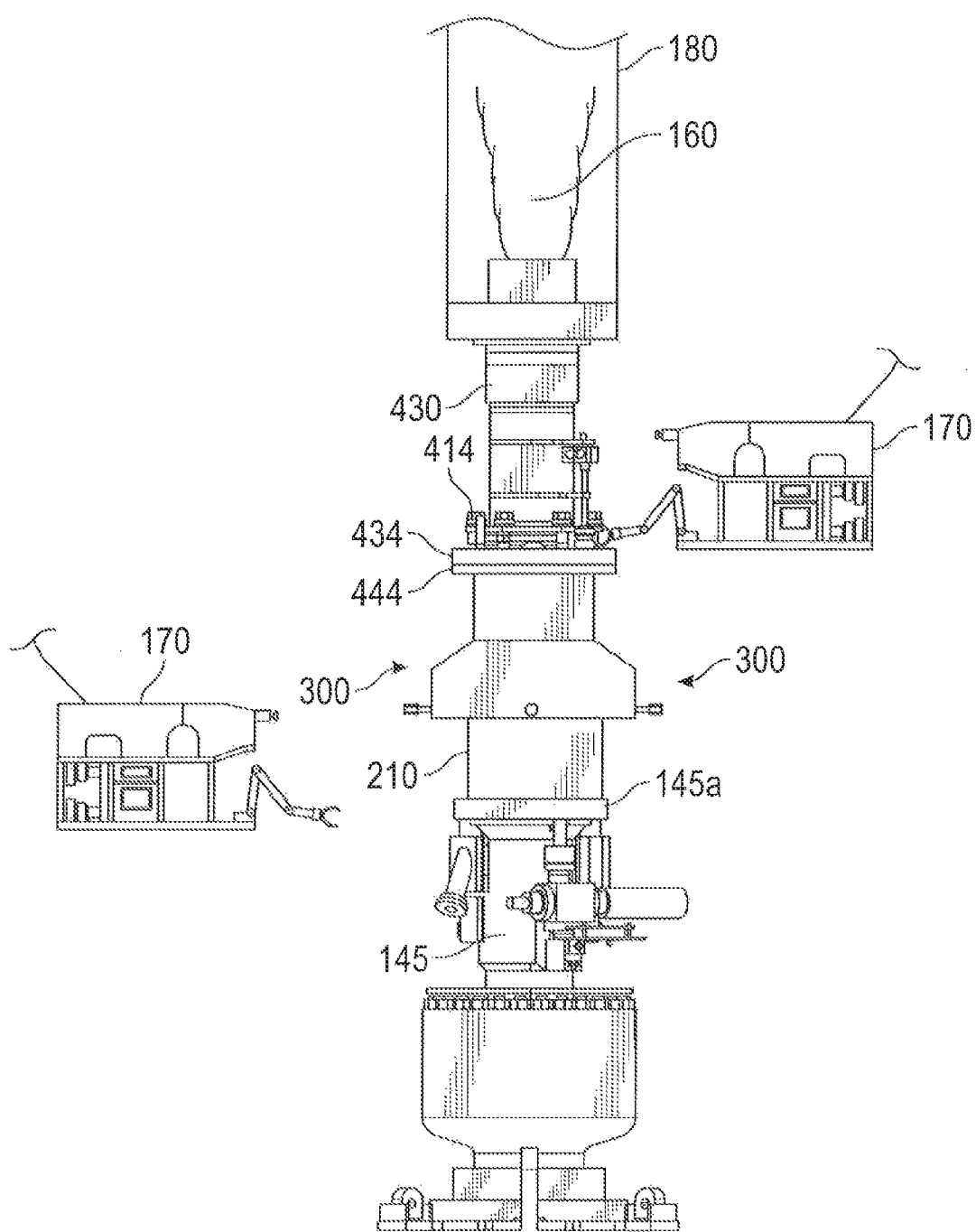

With overshot 300 positioned immediately above and generally coaxially aligned with male section 210, cables 180 lower spool 430 and overshot 300 axially downward, thereby placing the receptacle 308 over the male section 210 as shown in FIG. 8D. During installation of spool 430, emitted hydrocarbons flow freely through spool 430, thereby relieving well pressure and offering the potential to reduce the resistance to the axial insertion of overshot 300 onto male section 210.

Figure 8E:
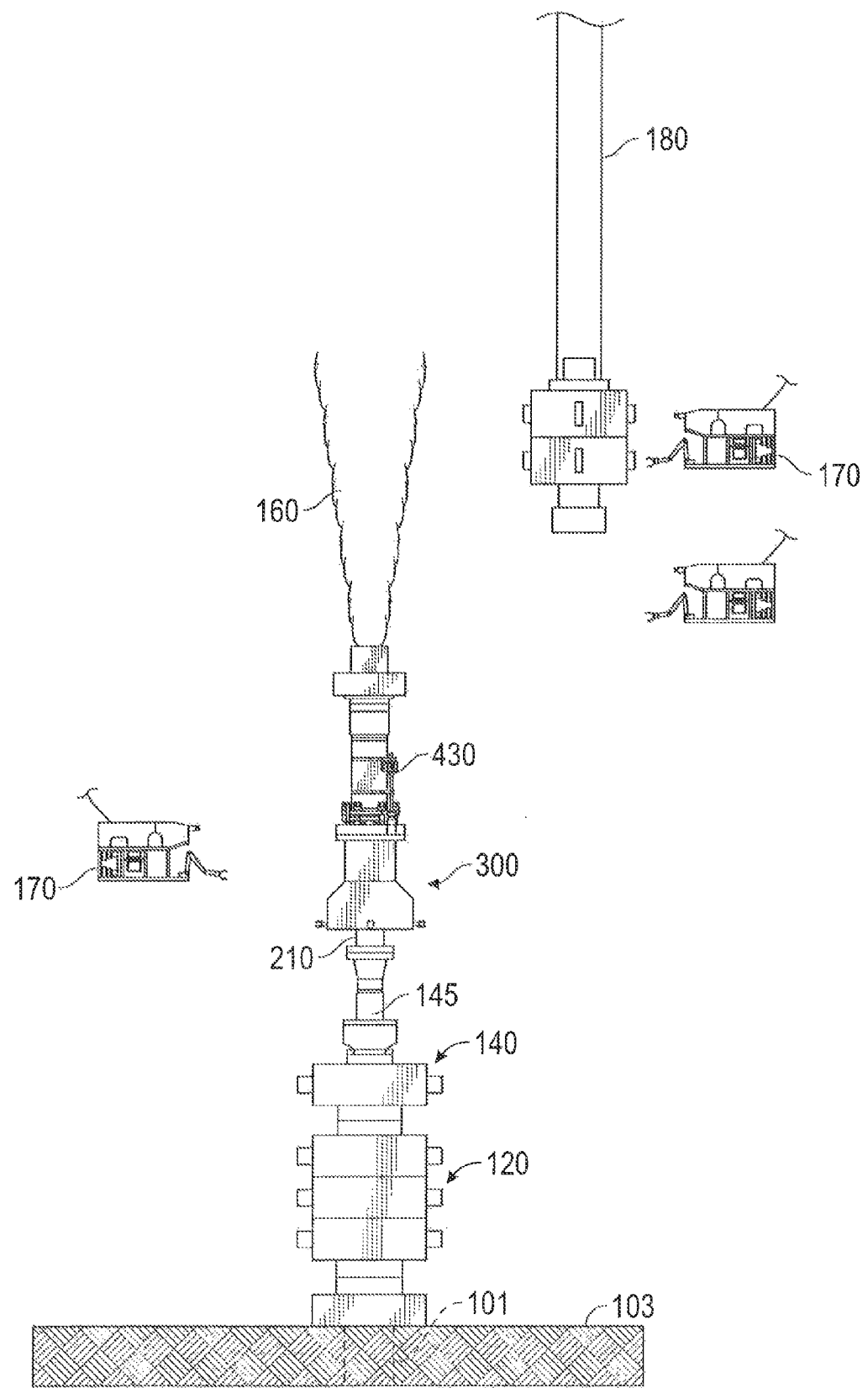

As described above and shown in FIG. 4, once overshot 400 is installed onto male section 210, the connection is sealed via seal 330. Additionally, the overshot 300 is secured to male section 210 as a result of balls 321 being wedged between surfaces 215, 304b. Referring now to FIG. 8E, with a sealed, secure connection between spool 430, overshot 300 and male section 210, ROVs 170 decouple cables 180 from spool 430, and BOP 410 is controllably lowered subsea and coupled to upper end 430a of transition spool 330 with connector 150.

Still referring to FIG. 8E, BOP 410 is shown being lowered subsea with cables 180 secured thereto and extending to a winch or crane mounted to a surface vessel. Due to the weight of BOP 410, cables 180 are preferably relatively strong cables (e.g., steel cables) capable of withstanding the anticipated tensile loads. Although cables 180 are employed to lower BOP 410 in this embodiment, in other embodiments, BOP 410 may be deployed subsea on a pipe string. Using cables 180, BOP 410 is lowered subsea under its own weight from a location generally above and laterally offset from wellbore 101, BOP 120, LMRP 140, spool 430, and overshot 300, and outside of plume 160 to reduce the potential for hydrate formation within BOP 410.

Figure 8F:
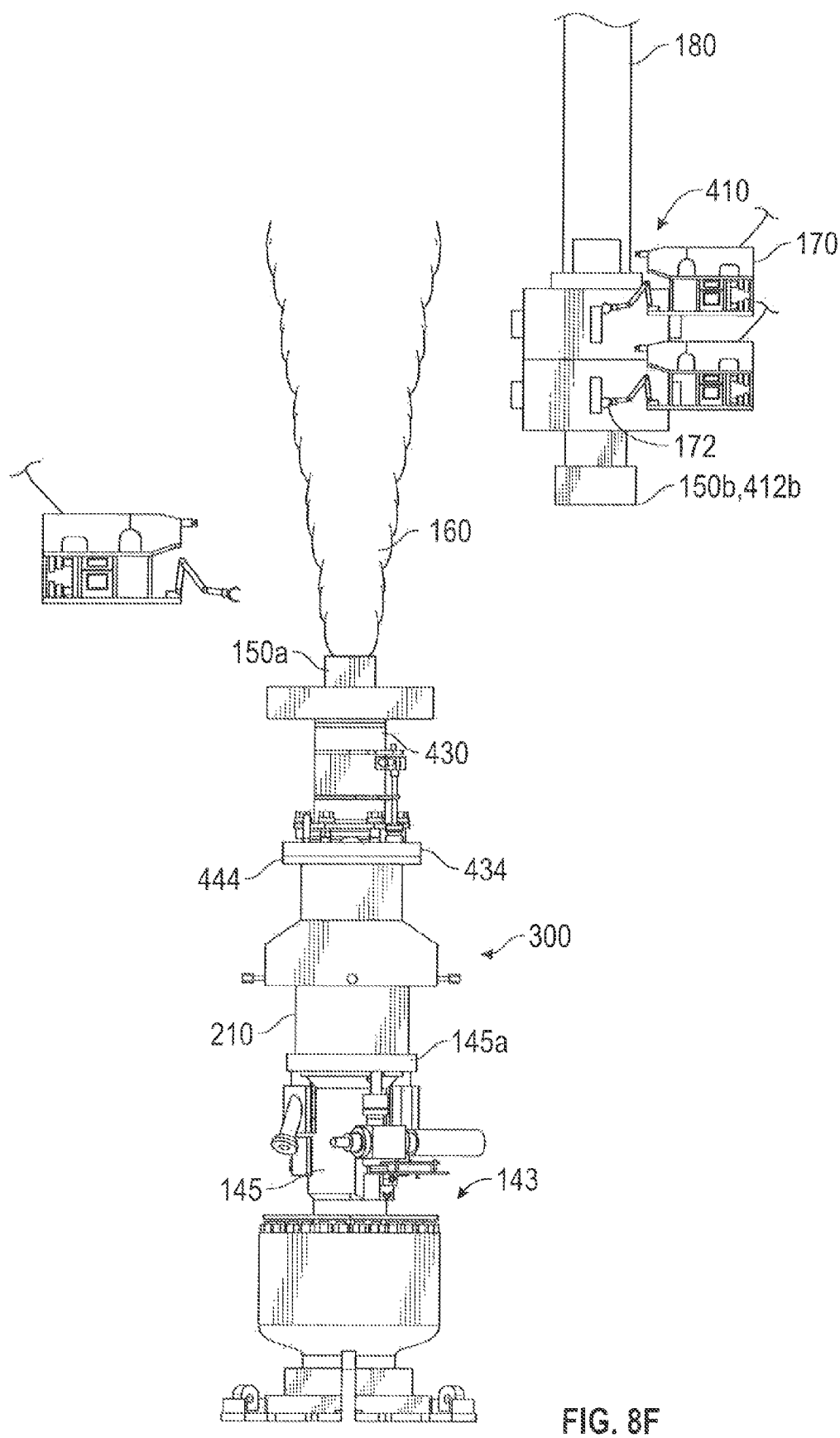
Figure 8G:
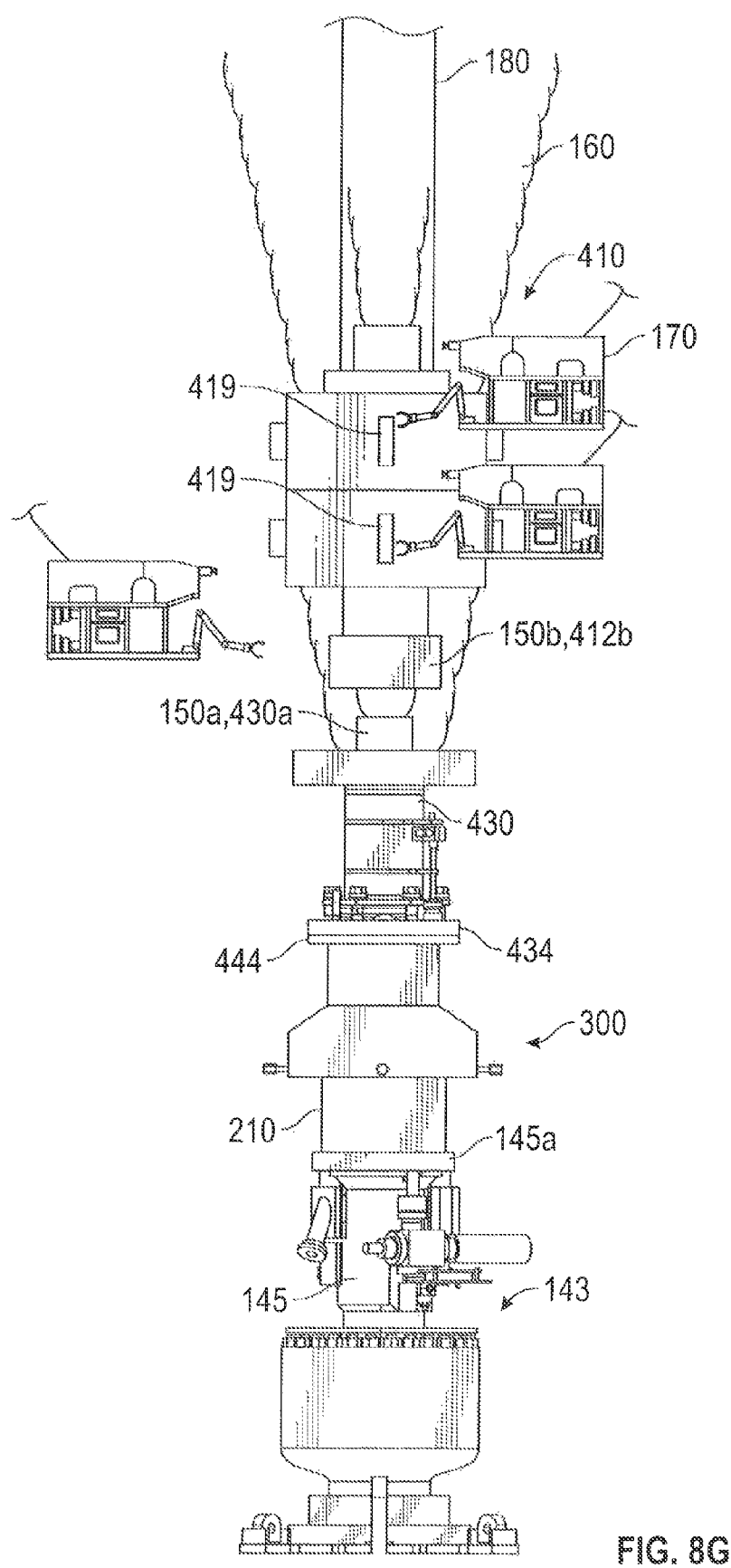

Moving now to FIG. 8F, BOP 410 is lowered laterally offset from transition spool 430 and outside of plume 160 until lower end 412b is slightly above spool 430. As BOP 410 descends and approaches spool 430, ROVs 170 monitor the position of BOP 410 relative to spool 430. Next, as shown in FIGS. 8F and 8G, BOP 410 is moved laterally into position immediately above spool 430 with female coupling 150b at lower end 412b generally coaxially aligned with male coupling 150a at upper end 430a of spool 430. One or more ROVs 170 may utilize their claws 172 and handles 419 to guide and position BOP 410 relative to spool 430.

Figure 8H:
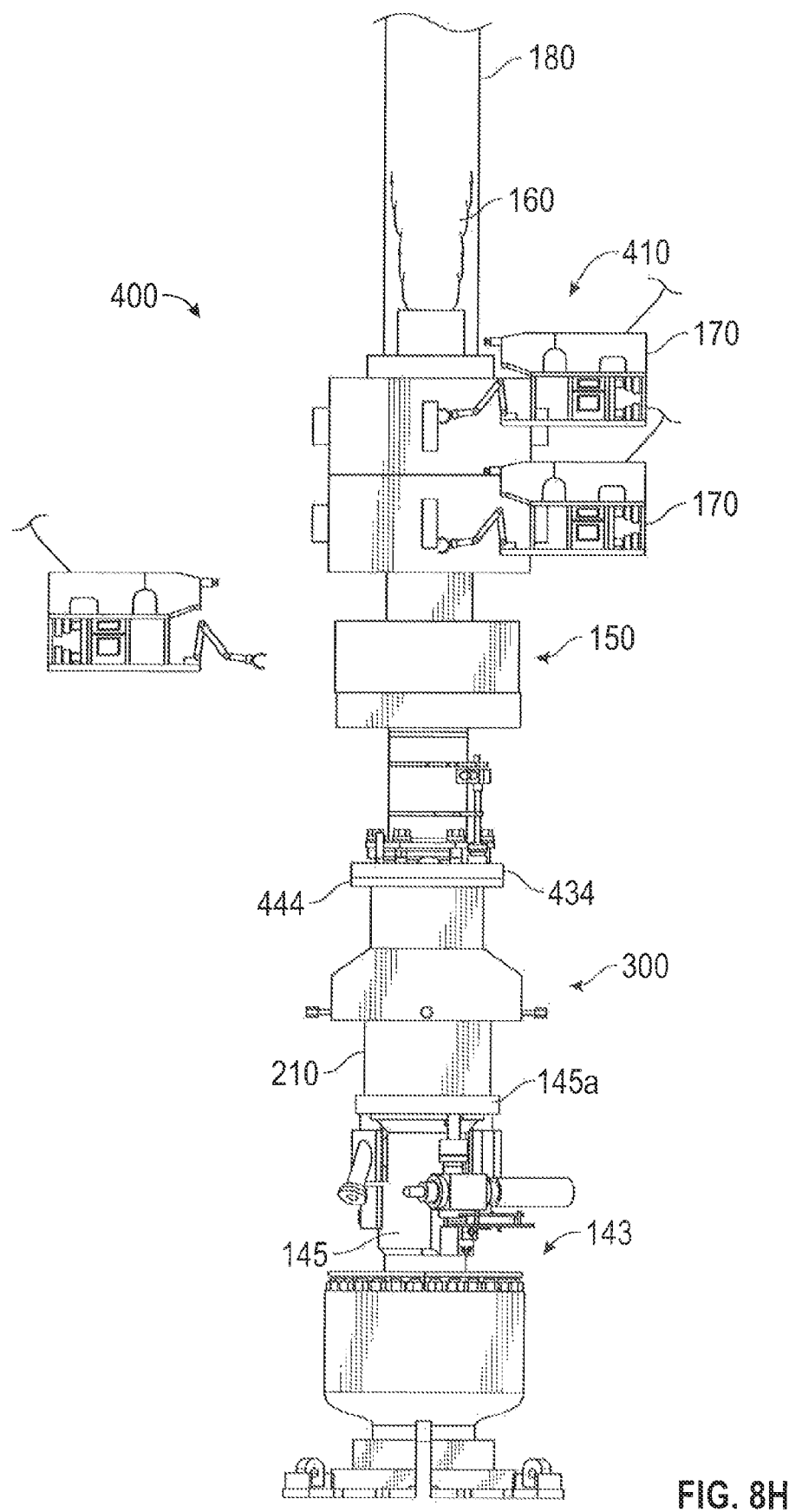

With BOP 410 positioned immediately above and couplings 150a, b generally coaxially aligned, cables 180 lower BOP 410 axially downward. Due to the weight of BOP 410, compressive loads between BOP 410 and spool 430 urge the male coupling 150a at upper end 430a into the female coupling 150b at lower end 412b. Once the male coupling 150a is sufficiently seated in the female coupling 150b to form wellhead-type connector 150, connector 150 is hydraulically actuated to securely connect BOP 410 to spool 430 and form stack 400 as shown in FIG. 8H.

Prior to moving BOP 310 laterally over riser adapter 145 and spool 330, rams 127 are transitioned to the open position allowing hydrocarbon fluids emitted by male section 210, locking overshot 400, and spool 330 to flow unrestricted through BOP 310, thereby relieving well pressure and offering the potential to reduce the resistance to the coupling of BOP 310 to spool 330. Rams 127 may be transitioned to the open position at the surface 102 prior to deployment, or subsea via one or more ROVs 170. Thus, as BOP 310 is moved laterally over spool 330 and lowered into engagement with spool 330, emitted hydrocarbon fluids flow freely through BOP 310.

With a sealed, secure connection between BOP 410 and spool 430, one or both rams 127 are transitioned to the closed position with an ROV 170, thereby shutting off the flow of hydrocarbons emitted from wellbore 101. Cables 180 may be decoupled from BOP 410 with ROVs 170 and removed to the surface once BOP 410 is secured to spool 430.

As a result, through use of locking overshot 300 in conjunction with capping stack 400, wellhead 103 has been sealed by simply placing overshot 300 over the remaining male section 210 of riser 115, without the need to engage any bolts or attachment means. Thus, the time required to seal wellhead 103 is greatly reduced when compared to traditional methods. As a result, the amount of hydrocarbon emitted to the ocean environment and the risk of further harm to either equipment or personnel is greatly reduced.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A subsea connection, comprising:
    an upward facing tubular stabbing member coupled to a subsea riser flex joint, the stabbing member having a central axis, an upper end, a radially inner surface extending from the upper end, and a radially outer surface extending from the upper end;
    a locking overshot coaxially disposed about the upper end of the stabbing member and releasably locked onto the stabbing member, the locking overshot including a tubular body having a lower end, a radially inner surface extending from the lower end, and a radially outer surface extending from the lower end;
    an annular locking ring disposed in an annulus radially positioned between the stabbing member and the body, wherein the locking ring includes an annular cage and a plurality of circumferentially-spaced locking balls retained by the cage;
    wherein the annulus has a width W measured radially between the stabbing member and the body, wherein the width W decreases moving axially downward toward the lower end of the body;
    a biasing member disposed within the annulus and configured to bias the locking ring axially toward the lower end of the body.

2. The subsea connection of claim 1, wherein the locking balls are wedged between the inner surface of the body and the outer surface of the stabbing member.

3. The subsea connection of claim 1, further comprising a plurality of circumferentially-spaced biasing members disposed within the annulus and configured to bias the locking ring axially toward the lower end of the body.

4. The subsea connection of claim 1, wherein the annulus is defined by an annular recess in the inner surface of the body and the outer surface of the stabbing member.

5. The subsea connection of claim 4, wherein the annular recess includes an annular shoulder and a frustoconical surface extending axially from the annular shoulder.

6. The subsea connection of claim 5, wherein the frustoconical surface is oriented at an angle α relative to the central axis, wherein the angle α is between 2° and 15°.

7. The subsea connection of claim 1, wherein a plurality of threaded holes extend radially through the tubular body from the outer surface of the tubular body to the annulus;
    wherein a pin is threadably disposed within each threaded hole, wherein each pin has a radially inner end configured to slidingly engage the cage.

8. The subsea connection of claim 7, wherein the pins are configured to cam the locking ring axially upward within the annulus.

\* \* \* \* \*